United States Patent
Forbes et al.

[11] Patent Number: 6,106,010
[45] Date of Patent: Aug. 22, 2000

[54] VEHICLE OCCUPANT PROTECTION SYSTEM HAVING A DUAL STAGE INFLATOR

[75] Inventors: William C. Forbes, Rochester Hills; Ernst M. Faigle, Dryden, both of Mich.

[73] Assignee: TRW Vehicle Safety Systems Inc., Lyndhurst, Ohio

[21] Appl. No.: 09/052,705

[22] Filed: Mar. 31, 1998

[51] Int. Cl.[7] .................................................. B60R 21/26
[52] U.S. Cl. ......................... 280/741; 280/735; 280/736; 280/742
[58] Field of Search .................................... 280/736, 741, 280/742, 735, 734

[56] References Cited

U.S. PATENT DOCUMENTS

| | | |
|---|---|---|
| 3,674,059 | 7/1972 | Stephenson . |
| 3,756,621 | 9/1973 | Lewis et al. . |
| 5,007,661 | 4/1991 | Lenzen . |
| 5,348,344 | 9/1994 | Blumenthal et al. . |
| 5,398,966 | 3/1995 | Hock . |
| 5,558,367 | 9/1996 | Cuevas . |
| 5,613,702 | 3/1997 | Goetz . |
| 5,799,972 | 9/1998 | Handman et al. . |
| 5,880,534 | 3/1999 | Mossi et al. . |

FOREIGN PATENT DOCUMENTS

| | | | |
|---|---|---|---|
| 2120043 | 8/1977 | Germany | 280/741 |
| 2281429 | 3/1995 | United Kingdom | 280/734 |

*Primary Examiner*—Eric Culbreth
*Attorney, Agent, or Firm*—Tarolli, Sundheim, Covell, Tummino & Szabo L.L.P.

[57] ABSTRACT

An inflatable vehicle occupant protection device system (10, 110) for helping to protect a vehicle occupant in a crash event includes a module (12, 112), which may be mounted in a vehicle and includes an inflatable vehicle occupant protection device (24, 124). A mechanism controls flow of inflation fluid from an inflator (26, 126) to the protection device (24, 124). The mechanism also includes a first igniter (30, 130) and a second igniter (32, 132), which provide for inflation fluid flow from the inflator (26, 126) to the inflatable vehicle occupant protection device (24, 124). The system (10, 110) also includes a crash sensor (14, 114) for sensing a vehicle crash event and providing an activation signal. The igniters (30, 130 and 32, 132) are responsive to the crash sensor (14, 114) over a shared signal path (16, 116 and 18, 118) between the module (12, 112) and the crash sensor (14, 114). A delay device (46, 146) delays actuation of the second igniter (32, 132) for a predetermined time period after actuation of the first igniter (30, 130).

4 Claims, 2 Drawing Sheets

VEHICLE OCCUPANT PROTECTION SYSTEM HAVING A DUAL STAGE INFLATOR

BACKGROUND OF THE INVENTION

1. Technical Field

The present invention relates to an inflatable vehicle occupant protection system for helping to protect a vehicle occupant in a vehicle collision. More particularly, the present invention relates to a vehicle occupant protection system having a dual stage inflator.

2. Description of the Prior Art

The automotive industry has continuously developed improved vehicle occupant protection systems in order to reduce injuries of vehicle occupants, such as occur during a vehicle collision. One such development is a dual stage inflator that can provide more than one rate of inflation fluid flow into an inflatable protection device, such as an air bag. Typically, vehicle occupant protection systems which include a dual stage inflator operate by controlling actuation timing of first and second igniters of the inflator. Conventional dual stage inflator systems have relatively complex circuitry for controlling actuation of the first and second igniters. This typically requires separate wiring for each igniter.

SUMMARY OF THE INVENTION

The present invention is directed to an inflatable vehicle occupant protection system for helping to protect a vehicle occupant. The system includes a module for mounting in a vehicle, which module includes an inflatable vehicle occupant protection device which, when inflated, helps to protect a vehicle occupant and an inflator for providing inflation fluid to inflate the vehicle occupant protection device. The system further includes a mechanism for controlling flow of inflation fluid from the inflator. The control mechanism includes a first electrically actuated igniter for, when actuated, providing for inflation fluid flow from the inflator to the vehicle occupant protection device. The control mechanism also includes a second electrically actuated igniter for, when actuated, providing for inflation fluid flow from the inflator to the vehicle occupant protection device. The control mechanism further includes a crash sensor for sensing a vehicle crash for which inflation of the occupant protection device is desired and for providing an activation signal to activate the first and second igniters. The first and second igniters are responsive to the crash sensor over a shared signal path. The control mechanism also includes an electrical circuit extending between the crash sensor and the module for providing the shared signal path to the first and second igniters. In addition, the control mechanism includes a delay device that is responsive to the activation signal for delaying actuation of the second igniter for a time period after the actuation of the first igniter.

An alternative embodiment of the present invention is directed to an inflatable vehicle occupant protection system which is also for helping to protect the vehicle occupant and which includes a module for mounting in a vehicle. The module includes an inflatable vehicle occupant protection device which, when inflated, helps to protect the vehicle occupant. The module also includes an inflator for providing inflation fluid to inflate the vehicle occupant protection device. The system further includes a mechanism for controlling flow of inflation fluid from the inflator. The control mechanism includes a first electrically actuated igniter for, when actuated, providing for inflation fluid flow from the inflator to the vehicle occupant protection device. The control mechanism also includes a second electrically actuated igniter for, when actuated, providing for inflation fluid flow from the inflator to the vehicle occupant protection device. The control mechanism further includes a crash sensor for sensing a vehicle crash for which inflation of the occupant protection device is desired. The crash sensor includes a delay device as an integral part of the sensor, which provides a first signal to actuate the first igniter and a second signal to actuate the second igniter at a predetermined time period after actuation of the first igniter. In this alternative embodiment, an electrical circuit extends between the crash sensor and the module for providing a signal path from the crash sensor to the module.

BRIEF DESCRIPTION OF THE DRAWINGS

Preferred embodiments of the present invention are illustrated in the accompanying drawings in which.

DETAILED DESCRIPTION OF PREFERRED EMBODIMENTS

Figure 1:
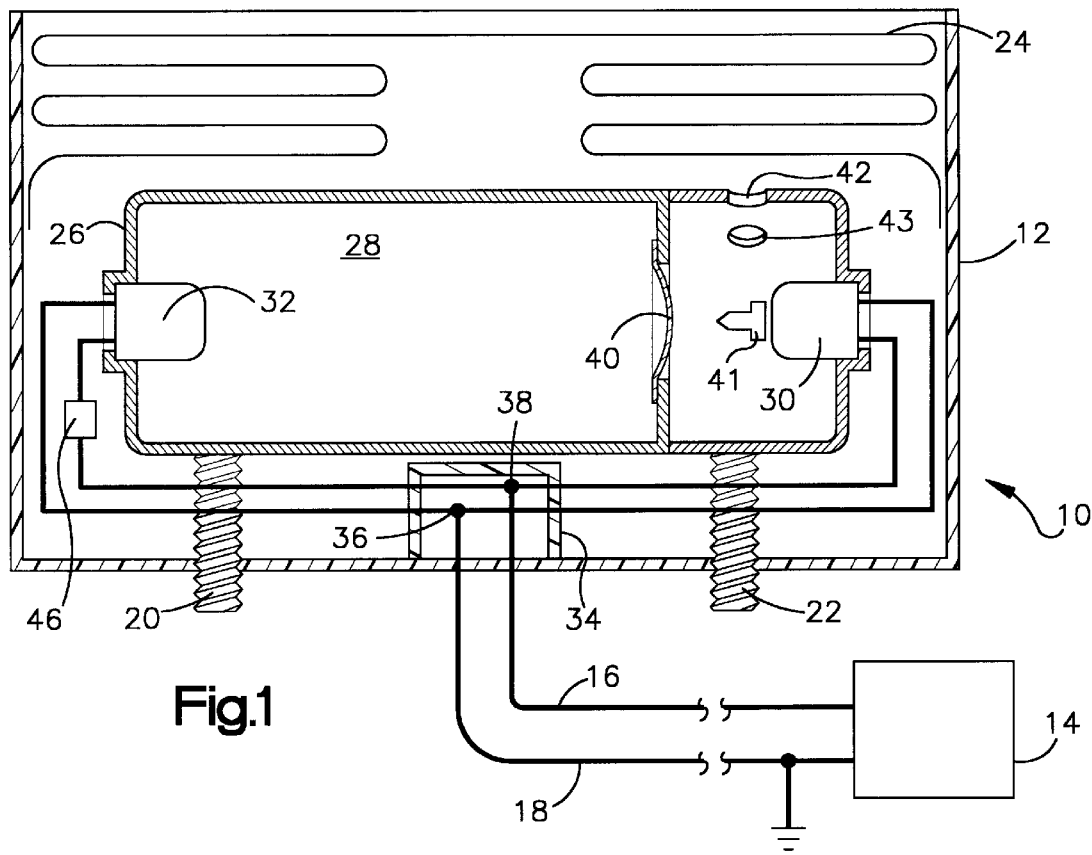
FIG. 1 is a schematic view, partially in section, of an inflatable vehicle occupant protection system in accordance with a first embodiment of the present invention.

FIG. 1 illustrates an inflatable vehicle occupant protection system, generally indicated as 10, which includes a module, indicated as 12, electrically connected to a crash sensor 14 by a pair of electrical conducting wires 16 and 18.

The particular configuration of the crash sensor 14 is not critical to the present invention. The crash sensor 14 may be any conventional sensor, including an acceleration sensor for sensing acceleration and/or deceleration or a pressure-sensitive or inertia-responsive device for detecting an impact. The crash sensor 14 need only sense a vehicle crash event for which inflation of an occupant protection device is desired. The crash sensor 14 includes an internal power source (not shown), suitably including a capacitor, which may be charged by the vehicle battery or alternator. Upon sensing a vehicle crash, the crash sensor 14 provides an activation signal to the module 12 over the electrical circuit which includes the wires 16 and 18 extending between the crash sensor 14 and the module 12. Preferably, the activation signal is supplied over the wire 16. The wire 18 provides a ground connection, which may be electrically isolated from the ground terminal of the vehicle battery. The shared signal path of the wire 16 reduces the necessary wiring requirements for the system 10.

The module 12 may be mounted in a vehicle at any desired location by any conventional means. In the illustrated embodiment, the module is mounted in a vehicle by screwing nuts, for example, (not shown) onto corresponding threaded fasteners 20 and 22.

The module 12 includes an inflatable vehicle occupant protection device 24, such as an air bag, which, when inflated, helps to protect a vehicle occupant from injury. Other inflatable vehicle occupant protection devices that can be used in accordance with the invention include, for example, inflatable seat belts, inflatable knee bolsters, inflatable head liners or side curtains, and knee bolsters operated by inflatable air bags. The module 12 also includes an inflator 26 for providing inflation fluid to inflate the inflatable protection device 24. FIG. 1 illustrates the inflator 26 as including a fluid chamber 28 in which desired materials, such as solid gas generating materials, gaseous materials or combinations thereof, may provide inflation fluid for inflating the inflatable protection device 24. The inflator 26 includes a rupturable seal or burst disk 40 which, when ruptured, enables inflation fluid to flow from the fluid chamber 28 through passages 42 and 43 in a diffuser, and into the inflatable protection device 24.

The inflator 26, in FIG. 1, is preferably a heated gas inflator, which has in chamber 28 a mixture of inert gas, such as nitrogen or argon, a flammable fuel gas, such as hydrogen or methane, and an oxidation gas, such as oxygen. A suitable heated gas inflator is disclosed in U.S. Pat. No. 5,348,344. The contents of the fluid chamber 28 are preferably pressurized, suitably to at least about 2,000 psi.

The module 12 also includes a first igniter 30 and a second igniter 32, both of which are electrically connected to an electrical connector 34, and preferably are connected to common electrical nodes 36 and 38 of the connector 34. The nodes 36 and 38 are electrically connected to wires 18 and 16, respectively. The conducting wires 16 and 18 thus form part of an electrical circuit between the crash sensor 14 and the module 12. The wire 16 provides a shared signal path from the sensor 14 to the module 12 for the crash sensor activation signal for both igniters 30 and 32. The wire 18 suitably provides a ground connection for the circuit.

The rupturable seal 40 is positioned adjacent to the first igniter 30, such that in response to the crash sensor 14 activation signal, the first igniter 30 causes the rupturable seal 40 to rupture, such as by forcing a generally rigid plunger member 41 into the seal 40. The rupturing of the seal 40 provides for inflation fluid to flow from the pressurized fluid chamber 28, through the passages 42 and 43 and into the inflatable protection device 24.

The system of FIG. 1 also includes a delay device 46, such as a bleed off resistor, a solid state time delay circuit or any other known time delay device. The delay device 46 is responsive to the crash sensor activation signal for delaying actuation of the second igniter 32 for a predetermined time period after actuation of the first igniter 30. The delay device 46 is positioned on the module 12 between the connector 34 and the second igniter 32, preferably adjacent to the igniter 32. The delay device 46 imposes a time delay upon the crash sensor activation signal to be received by the igniter 32. Preferably, actuation of the second igniter 32 will be delayed from about 10 milliseconds to about 20 milliseconds after actuation of first igniter 30. When the second igniter 32 is actuated, it provides for additional inflation fluid flow from the fluid chamber 28 through the passages 42 and 43 into the inflatable protection device 24.

Preferably, in the heated gas inflator schematically illustrated in FIG. 1, the second igniter 32 will ignite the fuel gas in chamber 28, which causes an increase in temperature of the gas in the fluid chamber 28 which results in a rapid increase in pressure within the chamber 28. The increased pressure, in turn, causes an increase in the inflation fluid flow into the inflatable protection device 24. Therefore, the present invention provides a simplified approach for providing for inflation of an inflatable protection device 24 in which the first and second igniters 30 and 32, respectively, are responsive to a single activation signal from the crash sensor 14 over a shared signal path distributed by the electrical connector 34 at the nodes 36 and 38.

Figure 2:
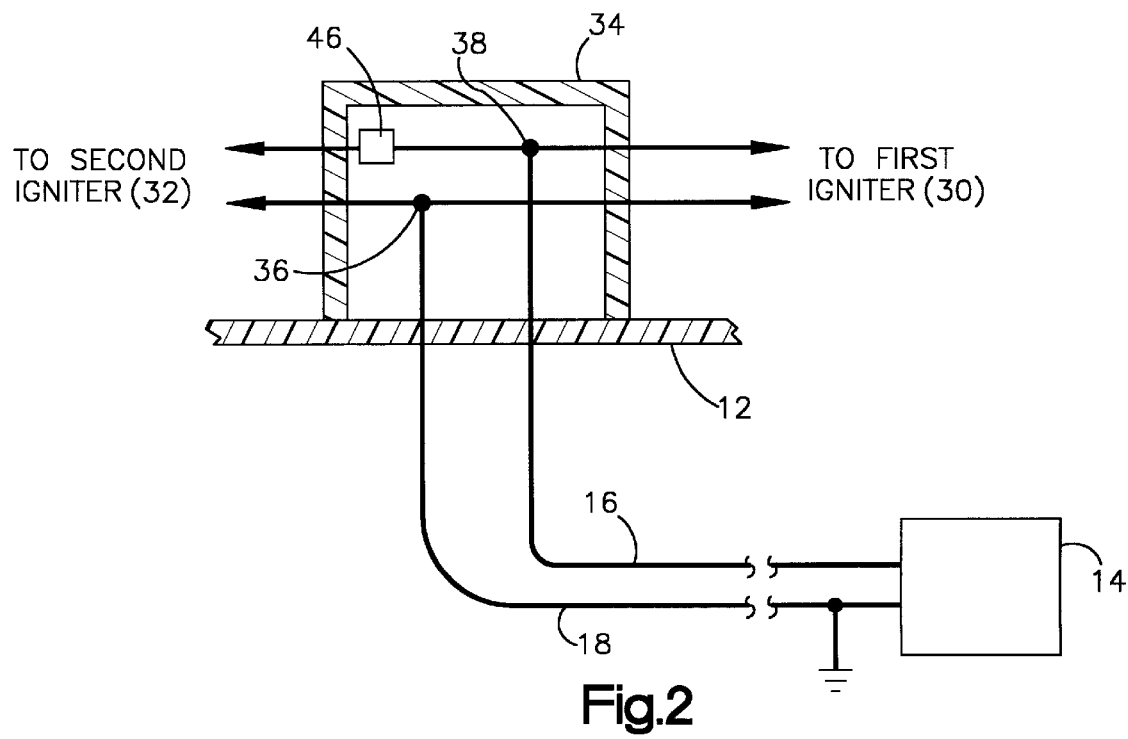
FIG. 2 is an enlarged view illustrating a second embodiment of the present invention.

Referring to FIG. 2, an embodiment of the present invention is shown in which a delay device 46 is formed of an electrical delay circuit in the connector 34 on the module 12. The connector 34 may conveniently include a female receptacle (not shown) for receiving a corresponding male connector part (not shown) for connecting the nodes 36 and 38 of the module 12 to the conducting wires 18 and 16, respectively. In this embodiment, the node 38 of the electrical connector 34 receives the crash sensor activation signal over the conducting wire 16. The connector 34 distributes this signal to the first and second igniters 30 and 32, respectively, via the node 38. The node 36 suitably provides a ground connection through conducting wire 18. The delay device 46 may also be connected to the ground wire 18. Connector 34 includes, as an integral part, the delay device 46 that imposes a predetermined delay in the signal being passed to the second igniter 32. The particular delay device 46 within connector 34 may, for example, be a fusable link, a solid state timer or any other conventional timing delay device.

Figure 3:
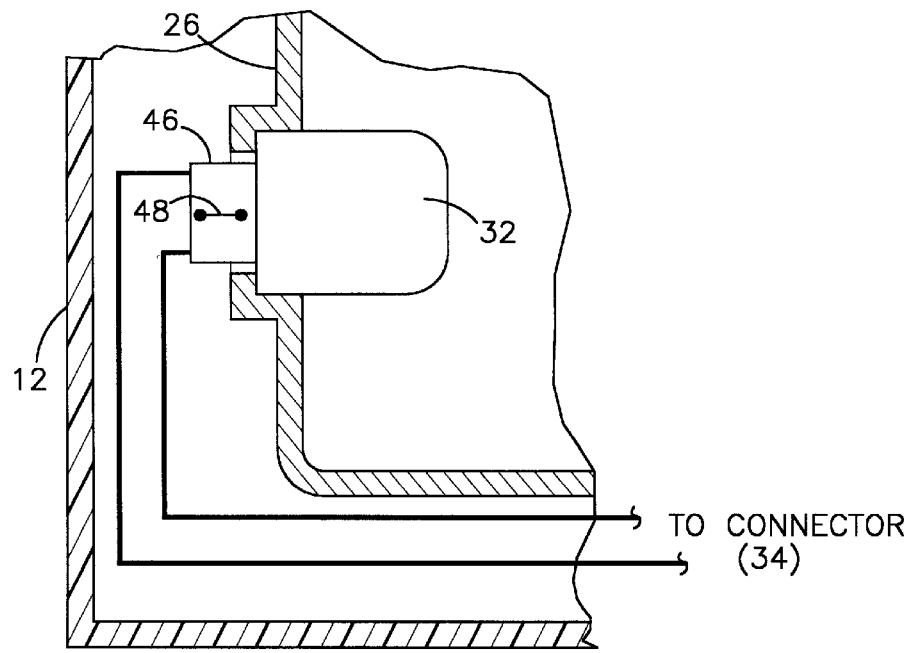
FIG. 3 is a schematic view illustrating a third embodiment of the present invention.

Alternatively, the delay device 46 may be located on the second igniter 32 on the module 12, such as is shown in FIG. 3. Again, the delay device 46 may be any conventional device or circuit for providing a predetermined amount of delay, suitably about 10 to about 20 milliseconds, from the activation of the first igniter 30. One acceptable configuration of the delay device 46 would be to utilize a pyrotechnic fuse or a fusible link, indicated schematically at 48, that is part of the second igniter 32, as shown in FIG. 3.

Figure 4:
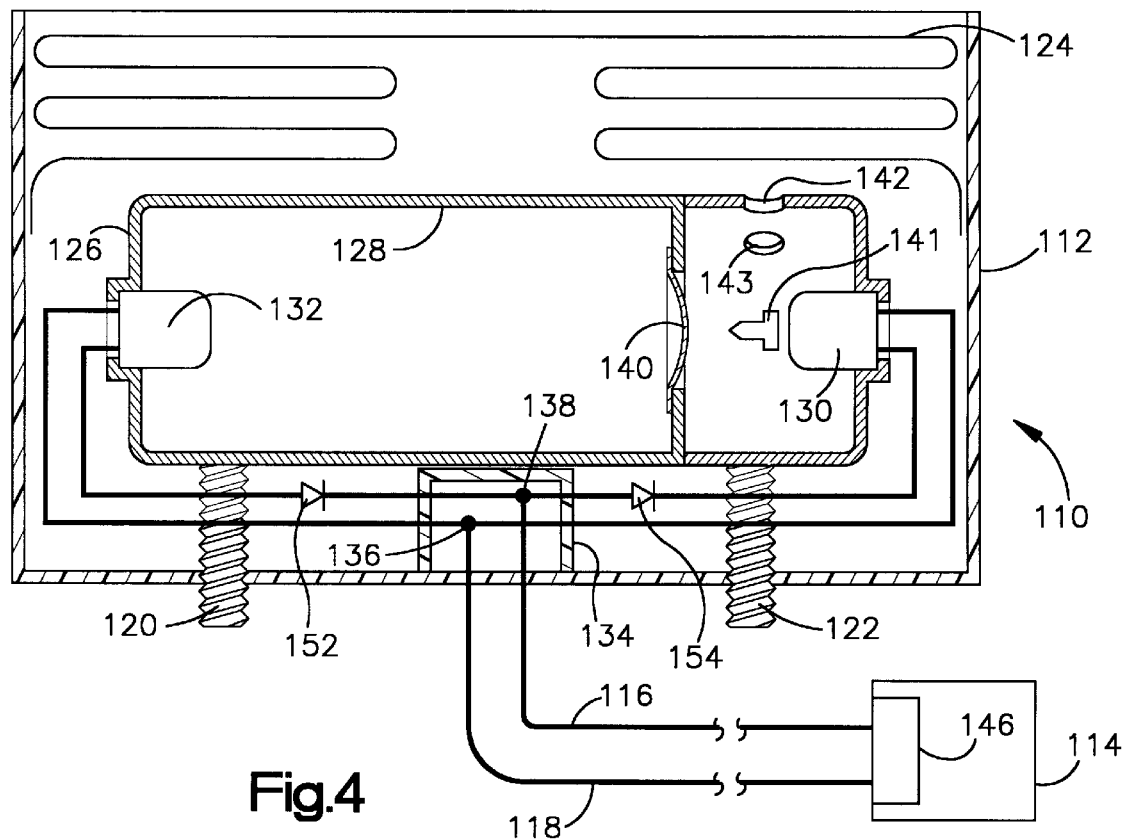
FIG. 4 is a schematic view illustrating a fourth embodiment of the present invention.

Another alternative embodiment of the present invention is shown in FIG. 4 in which numerals used in the embodiment of FIG. 1 are increased, by adding 100, to refer to similar components to those shown in FIG. 1. The system of FIG. 4 is directed to an inflatable vehicle occupant protection system 110 also capable of inflating an inflatable protection device 124 having a dual stage inflator. In this embodiment, a crash sensor 114 is electrically connected to a module 112 by a pair of conducting wires 116 and 118, which form a signal path between the crash sensor 114 and the module 112. Specifically, the module 112 includes an electrical connector 134, which is electrically connected to the wires 118 and 116 at nodes 136 and 138, respectively. The system 110 further includes a mechanism for controlling the flow of inflation fluid from an inflator 126, which mechanism includes a first igniter 130 and a second igniter 132, both of which, when actuated, provide for inflation fluid flow from the inflator 126 to the inflatable protection device 124. As shown in FIG. 4, the first igniter 130, when actuated by the crash sensor 114, ruptures the rupturable seal or burst disk 140 by forcing a rigid member 141 through the seal 140. This provides for inflation fluid flow from the inflator 126 through the passages 142 and 143 and into the inflatable protection device 124.

In this embodiment, the crash sensor 114 includes a delay device 146 as an integral part of the sensor 114. The crash sensor 114 provides an output having a predetermined polarity across the conducting wires 116 and 118. The crash sensor 114 provides a first signal to the module 112 to actuate the first igniter 130. At a predetermined time period thereafter, the crash sensor 114 provides a second signal to actuate the second igniter 132. This may be conveniently accomplished by the crash sensor 114 providing a first activation signal having a first polarity over conducting wire 116. While the first activation signal is being supplied, the wire 118 provides a ground or neutral potential. After a predetermined time period of about 10 to about 20 milliseconds, which is caused by the delay device 146, the sensor 114 provides a second activation signal. The second activation signal has an opposite polarity across the conducting wires 116 and 118 from that of the first activation signal. That is, the second activation signal flows to the module 112 and second igniter 132 over the conducting wire 118, with the conducting wire 116 providing the ground or neutral potential for the circuit.

In order to isolate the second igniter 132 from the first crash sensor activation signal, as shown in FIG. 4, a first diode 152 is positioned between the electrical node 138 and the second igniter 132 and a second diode 154 is positioned between the electrical node 138 and the first igniter 130. The diodes 152 and 154 will allow an activation signal of a first polarity to actuate the first igniter 130, and will allow the activation signal having an opposite polarity to actuate the second igniter 132. Thus, a change in activation signal polarity forms two distinct activation signals, each operable on one of the first and second igniters 130 and 132 over the shared signal path from the crash sensor 114 to the module 112. As stated above for this embodiment, the shared signal path preferably is defined by the conducting wires 116 and 118 positioned between the crash sensor 114 and the module 112. Alternatively, the system components may be appropriately grounded and a single conducting wire may provide the shared signal path. Like the other embodiments, the shared signal path reduces the required wiring harness of the system 110.

While the foregoing describes particularly preferred embodiments of the present invention, it is to be understood that the description and the illustrations are indicative only of the principles of the invention and are not to be considered limiting. Because numerous variations and modifications of the invention, all within the scope of the invention, will readily occur to those skilled in the art, the scope of the invention is to be defined by the appended claims.

Having described the invention, the following is claimed:

1. An inflatable vehicle occupant protection system for helping to protect a vehicle occupant in a collision, said system comprising:

a module for mounting in a vehicle and comprising an inflatable vehicle occupant protection device which, when inflated, helps to protect a vehicle occupant, and an inflator for providing inflation fluid to inflate said vehicle occupant protection device, said inflator including a diffuser and a chamber containing combustible gasses; and a mechanism for controlling flow of inflation fluid from said inflator, said mechanism comprising:

a first electrically actuated igniter located outside of said chamber for, when actuated, providing for inflation fluid flow from said chamber to said vehicle occupant protection device without igniting said combustible gasses;

a second electrically actuated igniter located inside of said chamber for, when actuated, igniting said combustible gasses and providing for increased inflation fluid flow from said inflator to said vehicle occupant protection device;

a crash sensor for sensing a vehicle crash for which inflation of said occupant protection device is desired, said crash sensor comprising a delay device as an integral part of said crash sensor, said crash sensor providing a first signal to actuate said first igniter and a second signal to actuate said second igniter at a predetermined time period after actuation of said first igniter; and an electrical circuit extending between said crash sensor and said module for providing a signal path from said crash sensor to said module, said electrical circuit providing a shared signal path for said first and second signals.

2. The apparatus as defined in claim 1 wherein said second signal has a substantially opposite polarity from said first signal.

3. The apparatus as defined in claim 1 wherein said predetermined time period ranges from about 10 milliseconds to about 20 milliseconds.

4. An inflatable vehicle occupant protection system for helping to protect a vehicle occupant comprising:

a module for mounting in a vehicle including an inflatable vehicle occupant protection device which, when inflated, helps to protect a vehicle occupant;

an inflator for providing inflation fluid to inflate said vehicle occupant protection device, said inflator including a diffuser and a chamber containing combustible gases;

a mechanism for controlling flow of inflation fluid from said inflator, said mechanism comprising:

a first electrically actuated igniter located outside of said chamber, said igniter, when actuated, providing for inflation fluid flow from said chamber to said vehicle occupant protection device without igniting said combustible gases;

a second electrically actuated igniter located inside of said chamber, said igniter, when actuated, providing for increased inflation fluid flow from said chamber to said vehicle occupant protection device;

a crash sensor for sensing a vehicle crash for which inflation of said occupant protection device is desired and for providing an activation signal to activate said first and second igniters, said first and second igniters being responsive to said crash sensor over a shared signal path;

an electrical circuit extending between said crash sensor and said module for providing said shared signal path to said first and said second igniters;

a delay device responsive to said activation signal for delaying actuation of said second igniter for a time period after actuation of said first igniter; and wherein said mechanism further comprises an electrical connector on said module for distributing said activation signal to said first and second igniters, said electrical circuit extending from said crash sensor to said electrical connector and said delay device comprising an electrical delay circuit in said connector.

* * * * *